Patented July 11, 1933

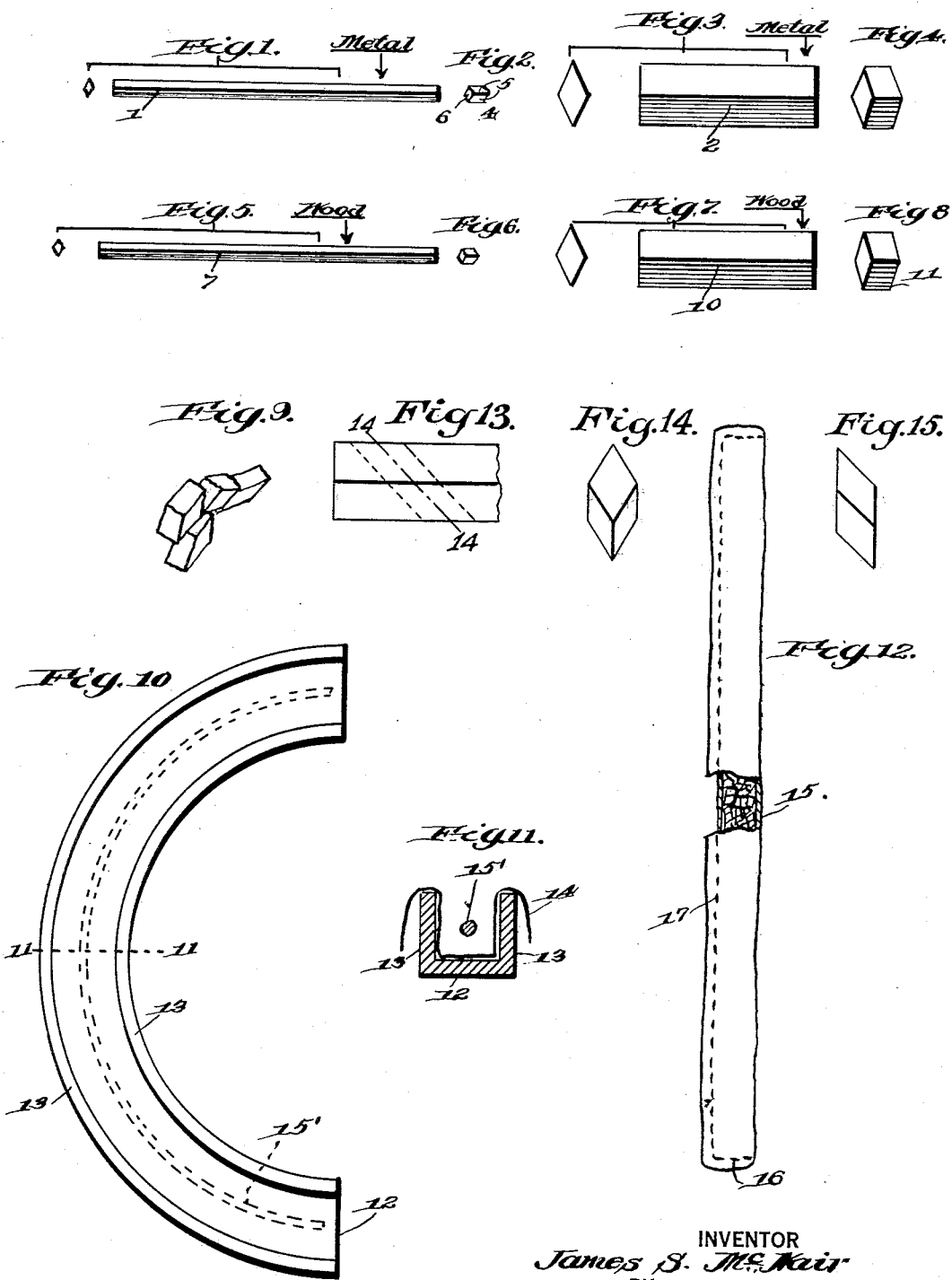

1,917,769

UNITED STATES PATENT OFFICE

JAMES S. McNAIR, OF SPOKANE, WASHINGTON, ASSIGNOR TO RELIANCE PACKING & MANUFACTURING CO., A CORPORATION OF WASHINGTON

ANTIFRICTION PACKING

Application filed April 14, 1931. Serial No. 529,994.

The object of this invention is to provide an improved packing and the invention resides in the packing and also in a form of integer of the packing.

The invention has to do with what is known as a metallic packing by reason of the fact that metal forms an important constituent. However, the packing of this invention includes constituents that are not metallic and hence I will hereinafter refer to the article as a semi-metallic packing.

As a further definition, it may be stated that while lubricants constitute certain constituent elements of the packing, still, they are of such moiety with respect to the aggregate mass of hard body elements that the latter clearly constitutes the main body constituent.

In accordance with this invention I employ what I will designate as an aggregate mass of hard body elements of two characters, one type being of relatively greater density than the other, and the harder of the two types of elements having the primary function of sustaining friction while the other, or remaining type, has as its main function the capacity of spacing the harder elements from each other and preventing the latter from accumulating in massed isolation.

It is a very special feature of the invention to provide dense or hard elements that will function anti-frictionally in the bearing and while it is necessary to provide such elements in a relatively wide range of sizes to cope with widely different bearing uses, still, it is a feature in all cases, to cause such elements to present definite forms or shapes.

In the most improved form of the invention, the anti-friction elements have well defined angular forms, irrespective of their size, and while it may not always be possible to eliminate rounded or curved surfaces therefrom, still, in accordance with my invention, such rounded or curved surfaces are in such a minority, with respect to the angular surfaces, as to be nugatory as far as any functional capacity thereof is concerned.

It is the great desideratum of the invention to provide anti-friction elements that are not only angular in form but which also present on substantially all sides thereof, plane surfaces, hence it will now be clear that if any of these plane faces should juncture on a rounded or curved connection, such curvature would be far too slight in area to in any way function.

It is a feature of the invention to provide spacing elements that are primarily angular and which to a maximum extent present plane faces of well defined contour, and as these spacing elements are thoroughly intermingled with the anti-friction elements, it will be clear that the plane faces of each type of elements bearing against each other, under compressive stress, will merely permit a relatively slight shifting movement of the elements with respect to each other and will effectively prevent massing of one type of elements in substantial isolation from the other.

A further feature consists in congealing certain ingredients or employing a binder to hold the intermingled elements in distributed relation and preventing them from dispersing and thereby facilitating assemblage of the mass into a wrapper or into a bearing.

The invention has many other objects and features which will be more fully described in connection with the accompanying drawing and which will be more particularly pointed out in and by the appended claims.

In the drawing:—

Fig. 1 is a view in elevation of a bar of stock metal from which relatively small anti-friction bodies may be formed.

Fig. 2 is a view of one of the formed bodies.

Fig. 3 is a view in elevation of a larger metal bar from which bodies of a larger size may be formed.

Fig. 4 is a view of a formed body.

Fig. 5 is a view of a small size wood bar from which spacing bodies may be formed.

Fig. 6 is a view of a formed spacing body.

Fig. 7 is a view of a larger size wood bar from which larger size spacing bodies may be formed.

Fig. 8 is a view of a formed spacing body.

Fig. 9 is a fragmentary view of an assemblage of metallic and spacing bodies abutted to illustrate the general relation they would assume.

Fig. 10 is a plan view of an arcuate former into which the prepared packing material may be disposed when it is desired to wrap the assemblage.

Fig. 11 is a sectional view on line 11—11 of Fig. 10, showing how the wrapper is disposed upon the former.

Fig. 12 shows a wrapper sewed about a filling of the packing material and which is suitable for smaller bearings.

Fig. 13 is a view of a stock or bar from which either type of body may be severed.

Fig. 14 is an isometric perspective of a unit or body severed from said bar, and looking at the end of said unit or body.

Fig. 15 is a view of the same in side elevation.

Like characters of reference designate similar parts throughout the different figures of the drawing.

Before describing and setting forth the ingredients of the packing as a whole, I will first describe the materials forming the main body or aggregate mass of the packing, and reference will first be made to Figs. 1 to 4.

In the above figures I have illustrated one form of stock from which the metal bodies may be formed and the only distinction between Figs. 1 and 2, and 3 and 4, is that in the former I have illustrated a bar 1 from which relatively small size bodies may be formed, and in the latter, a bar 2, from which relatively large size bodies may be formed. In each case, I have shown a bar of polygonal, and specifically, diamond cross section so as to insure that the bodies cut therefrom will be angular in form, and with a diamond cross section.

It will also be clear that stock of this shape, when severed into lengths, will always result in bodies having well defined plane faces that are angularly disposed with respect to each other, that is, juncturing faces will be in such a relation. If the bar is severed on lines acutely or obliquely angular to the longitudinal axis of the bar, then all the juncturing faces will be acutely or obliquely angular to each other, as shown in Figs. 13 to 15. In some cases, as will be later described, I will sever the bar on parallel lines, in which event the severed faces will be parallel but even in this event, the juncturing faces will not be rectangularly disposed by reason of the inclination afforded by the diamond cross section. The lines of severance need not be always equally spaced when it is desired to form integers of different sizes from the same bar.

Therefore, from a single stock bar of one cross section, I can cut a variety of lengths, and while all the faces will be flat or plane, no two faces need be parallel. In Fig. 2, I have shown a metallic body 4, from which it will be seen that the sides 5, are angularly disposed with respect to each other and the ends 6, are also angularly disposed to each other and to the sides 5. The larger bar 2, is also shown to be diamond shaped in the end view, and in Fig. 4, I have shown how a large size body or integer may be formed from a severed length of bar 2, with parallel ends. In many cases, the metallic bodies will be cut or formed from bars of gradated cross section from the smallest to the largest and with this variation in size, and the variation afforded by cutting different lengths, a wide variety of sizes may be obtained. While I have shown the bars 1 and 2, of diamond cross section, many other types of polygonal cross section may be employed and still be within the purview of this invention.

In Figs. 5 and 6, I have shown a small cross section bar of wood, as indicated at 7, and which may be severed into spacing bodies as shown in Fig. 6, wherein all the sides are well defined and angular to each other. The wood bar 10, which is shown of diamond cross section, may be severed into lengths to form larger size spacing bodies as indicated at 11, in Fig. 8. While I prefer to use, and have obtained the best results from relatively soft wood bars, in forming the spacing bodies, any other suitable non-metallic material may be used that will perform the same function.

Without going into methods of quantity production, the foregoing will illustrate at least one method of producing the metallic and spacing bodies. It may be stated that I consider it novel, as a constituent part of a packing of this type, to make either body in the specific form shown.

Reference will next be made to one specific composition of the novel packing of my invention, reference being first made to the composition of the metallic bars.

The preferred composition of the metal is as follows:—eighty to ninety percent lead. This spread is given because of the difference in conditions as between light and heavy duty bearings and the proper percentage will be dictated by mechanical skill, in view of the present disclosure. About two to fifteen percent antimony and one to five percent tin. The above, would be suitable for what is known as the normal temperature type of bearing, in which the primary and antifriction ingredient, namely, lead, would be used. For high temperature work such as for bearings in a super-heated steam plant, the primary or anti-friction ingredient would preferably be copper, in substantially the same percentage as given for lead.

As regards normal temperature bearings, the function of the antimony is to harden the lead and the tin toughens the metal. For high temperature work, the antimony of course would not have any hardening effect on copper and might be dispensed with but the tin would be used to toughen the material.

The lubricant ingredient, for all types of packing, will comprise a lubricating oil, of suitable consistency for the duty to be performed, and which will always be the main body ingredient, and in addition thereto, minor quantities of graphite and greases will be added. Generally, the oil will form about 75 percent and the graphite 10 percent and the greases about 15 percent.

By reason of the fact that the formed packing is unstable, I also add to the lubricant ingredient a binder which may consist of tallow, bees wax or paraffin and which serves to adhere the unstable bodies.

The spacing ingredient will preferably consist of bodies of soft wood as the latter is more porous and hence is more easily saturated with the lubricating oil. However, in some forms of the invention, hard wood may be used. In all of the tests so far made, I have found it best to employ the anti-friction and wood bodies in equal proportions, or in other words, I use a half and half mixture so that in theory, there will be as many spacing bodies as there are metallic ones. In the following description of one manner of making the packing, it will be seen that the metal and wood bodies form the great preponderant of the mixture. At this point I desire to stress the fact that I do not wish to be limited to the use of wood for the spacing bodies as any other material that is non-metallic and that has any capacity for absorbing the lubricant and anything like the general characteristics of wood, might, under some conditions, be employed, although to the best of my knowledge, any substitute for wood would have to be substantially different from any metal.

Reference will next be made to one manner of making the packing.

I first partly fill a suitable vessel with a proportioned quantity of the selected lubricating oil, graphite and greases and binder and heat the vessel to reduce the contents to a watery consistency, or to such an extent as thoroughly to melt the binder graphite and greases so that they can be stirred and effectively mixed with the lubricating oil. It is also advantageous to heat the contents to a liquid condition for the reason that the wood bodies are more easily saturated thereby.

With the contents now reduced to liquid form, I then put into the same, a quantity of the spacing bodies sufficient for the amount of packing I desire to make in the batch, and these bodies are constantly stirred, and are allowed to remain in the heated liquid until the wood bodies are thoroughly saturated. Thereupon, I employ a straining ladle and remove the spacing bodies and at the same time drain off the surplus lubricant back into the vessel. The spacing bodies are then deposited on a suitable support and exposed to normal temperature and allowed to cool.

I next select a quantity of anti-friction bodies equal in number, as far as possible by bulk, to the number of spacing bodies, and dispose these anti-friction bodies into the melted lubricant and stir them just long enough to thoroughly surface or coat the peripheries of said bodies, but not long enough to heat the bodies throughout their cross section as that would require an unnecessary waste of time in cooling them. The metal bodies are then withdrawn by a straining ladle to drain off the surplus lubricant and said bodies are allowed to cool.

The now cooled metallic and wood bodies are thoroughly intermingled as I find that when cooled, it is easier to mix them, as the oils do not offer adhesive interference.

After the bodies have been intermingled, a slight quantity of the lubricant is poured over them and allowed to congeal, and it is in this step that the binder, previously referred to, principally functions, as it acts as a cohesive agent that sufficiently unites the mass in a manner greatly to facilitate shaping the same to a definite form and maintain the original distribution. Subsequently, the binder has no function although it is of a character that does not interfere with functional operations of any of the other ingredients.

When the mass is congealed it is shapeless as far as its bulk is concerned but it is in a condition to be manipulated into the form desired, which will be presently described.

At this point, it is desired to state that the relative size of the bodies 4 and 9 depends upon the character of bearing they are made to serve, and in some cases, these bodies are graduated in size from small to large so that the smaller ones can fill the voids between the larger ones. In relatively small bearings, the range between the smallest and the largest will be of course less than with larger bearings because of the difference in area of the packing glands. In a relatively large bearing, the gland will permit of relatively large maximum size bodies and they need not be graded down to such an extent as in relatively small bearing glands. However, in the smaller glands, the largest bodies will be relatively small and they must be graded down to relatively fine minimums.

As an example, the largest bodies so far made, have a mesh measurement of 2 x 2 or ½″ mesh and the smallest, a mesh measurement of No. 8 mesh or $\tfrac{1}{10}$″ mesh. In this example, I refer to both the metallic and spacing bodies.

In some of the larger bearings where clearance between the shaft and a portion of the bearing is very great, and where the smaller bodies or integers would obviously be forced beyond the gland, it is a feature of this invention to construct a packing in which all of the solid integers are of the same size, and of a maximum size, both as regards the anti-friction metal and the spacing wood bodies.

For the above condition, the diamond cross section type lends itself with particular facility by reason of the fact that the diamond shaped integers bunch and bank so compactly when assembled, which advantage is due primarily to this particular contour. This feature is one which I consider novel in itself.

It is informative to state that while none of the bodies is inherently capable of yielding nor are they resilient but there is a certain yield to the mass under compression stress by reason of the fact that the bodies can shift their relative positions with respect to each other, which they easily do, as a result of efficient lubrication. Thus, as compression is increased, the smaller bodies shift into voids that are not filled in the initial assembly and before pressure of the gland is applied. Further, this shifting movement is facilitated because of the acute and obtuse angular contour of said bodies, which would not be true if the bodies were rectangular.

In addition to the angular feature, it is very important that the metal and wood bodies have well defined plane faces, as it will be clear that these bodies might be acutely or obtusely angular and have faces which are rounded in contour, and if such were the case, the intervening spacing bodies would be ground and distintegrated by the shifting and pressure exerted by the metal bodies, and hence the life of the spacing bodies would be materially shortened. Consequently, it is a feature of the invention to provide the metal and wood bodies with plane faces so that irrespective of the size of said bodies, their engagement will be of the flat abutting type or character and hence neither the metal or wood bodies can "roll" and separate into groups isolated from each other although they are free to shift their relative positions under pressure so as constantly to reduce their bulk to a denser mass.

Next reverting to some of the ways in which the packing material can be shaped to the desired form, reference will be made to Figs. 10 and 11.

With the loose bodies disposed in shapeless bulk, as they will be when withdrawn from heating vessel and after they are intermingled, it will be clear that the binder will prevent the bodies from escaping from their distributed relation so that as they are shaped into the desired form, they will retain their distributed relation.

Assuming that the packing was being prepared for a relatively large size bearing, I may employ a form as shown having bottom and side walls 12 and 13, respectively, forming a trough-like structure and being semi-circular as shown in the plan view Fig. 10. Thus, one half of a ring of packing would be formed at one time. I may employ a wrapper such as tin foil or like material which would later disintegrate.

As shown in Fig. 11, the wrapping material 14, is disposed in the U-shaped form in a manner to line the interior thereof and with marginal portions projecting over the side walls 13. With the parts in this position, the congealed packing is disposed onto the wrapper 14, within the form, until the latter is filled, and then the free margins of the wrapper 14 are folded over the material to completely encase it. Then the wrapped packing is removed from the form and it then has a semi-circular shape that makes it possible to be disposed in a bearing, the wrapper functioning merely for this transfer from the mold to the bearing. After the next section is formed to complete the ring of packing, it is likewise disposed in the bearing as will now be clear to those skilled in this art. That portion of the wrapper 14 which comes next to the shaft or piston, or what ever kind of gland is packed, will soon be worn off and the packing will make contact with the rod or piston.

In cases where the packing is of large size, it is a feature to take some of the stress off from the wrapper by disposing a rod 15, of the anti-friction material, in the form when the latter is about half filled and curve the rod 15′ to conform to the semi-circular form. Then the balance of the material is filled in and the stiffening rod 15′ will help maintain the packing in the shape in which the form has imparted to it. As the rod 15′ is of the same material as the metallic bodies, it will give and yield as the packing is compressed and will form an addition to the anti-friction ingredient.

In some forms, especially small duty requirements, a fabric or other material tube 15, may be employed, as shown in Fig. 12, and filled with the packing and closed at the ends 16. In Fig. 12, I have shown the wrapper as being sewed lengthwise at 17 and across the ends 16. After this kind of wrapper is filled, it can be bent to the form of the gland and hence can be made in one piece.

It will be seen that all of the bodies or blocks, both metal and wood, are geometric, and that they therefore differ substantially from a formless shred or particle of sawdust. It will also be clear that I have disclosed a spacing block made of wood that is absorbent and is saturated or soaked with oil and hence I have disclosed an oil soaked or oil carrying spacing block adapted to supply lubricant to the metal blocks to facilitate free sliding movement of all of said blocks along and against each other.

It is believed that the invention will be fully understood from the foregoing description, and it will be understood that I do not wish to be limited to the specific disclosure made herein except for such limitations as the claims may import.

I claim:—

1. In a semi-metallic packing, a mass aggregate comprising in part, metallic bodies of well defined angular form having plane faces for primarily sustaining friction and compressive stresses, and in part, of spacing bodies of wood of well defined angular form and having plane faces for separating said metallic bodies from each other, and said metallic and wood bodies being intermingled and freely slidable along and against each other, and a lubricant sufficient substantially to saturate said wood bodies and liberally coat said metallic bodies, and whereby said saturated wood bodies will supply lubricant to said metal bodies.

2. In a semi-metallic packing, a mass aggregate consisting in part of metallic bodies of diamond cross section presenting flat plane faces in angular relation to each other, and in part of oil carrying spacing bodies of diamond cross section presenting flat plane angular faces, and a lubricant coating said bodies.

3. In a semi-metallic packing, a mass aggregate consisting in one part of geometric metallic blocks of diamond shape having plane faces for primarily sustaining friction and compressive stresses, and of another part of geometric wood spacing blocks of diamond shape and having plane faces for separating said metallic blocks from each other, and said metallic and spacing blocks being intermingled and freely and individually slidable against and along each other, and a lubricant interspersed among said blocks.

4. In a semi-metallic packing, a mass aggregate consisting in one part of geometric metallic blocks having plane faces in different angular relation to each other for primarily sustaining wear, friction and compressive stresses, and of another part of geometric spacing blocks of oil absorbent material having plane faces for separating said metallic blocks from each other, and said metallic and spacing blocks being intermingled and freely and individually slidable against and along each other, and said absorbent spacing blocks being soaked with a lubricant for facilitating relative sliding movement of said blocks with respect to each other.

5. In a semi-metallic packing, a mass aggregate consisting in one part of geometric metallic blocks having plane faces in different angular relation to each other for primarily sustaining wear, friction and compressive stresses, and of another part of geometric spacing blocks substantially equal in number to the number of metallic blocks and said spacing blocks being formed of an oil absorbent material and having plane faces in different angular relation to each other and being intermingled with said metallic blocks, and said spacing blocks being soaked with oil for supplying a lubricant to said metallic blocks.

6. In a semi-metallic packing, a mass aggregate consisting in one part of geometric metallic blocks having plane faces in different angular relation to each other for primarily sustaining friction, wear and compressive stresses, and of another part of geometric spacing blocks of substantially the same size as said metallic blocks and said spacing blocks being formed of an oil carrying material and having plane faces in different angular relation to each other and being intermingled with said metallic blocks, and said oil carrying spacing blocks being provided with a supply of lubricant for application to said metallic blocks to permit said blocks to individually slide freely along and against each other.

7. In a semi-metallic packing, a mass aggregate consisting in one part of geometric metallic blocks having plane faces in different angular relation to each other for primarily sustaining wear, friction and compressive stresses, and of another part of geometric spacing blocks substantially equal in number and of substantially the same size as said metallic blocks and said spacing blocks being formed of an oil carrying material and having plane faces in different angular relation to each other and being intermingled with said metallic blocks, and said spacing blocks being provided with a supply of oil for application to said metallic blocks to permit all of said blocks to slide freely along and against each other.

8. In a semi-metallic packing, a mass aggregate consisting in one part of geometric blocks having plane faces of different angular relation to each other for primarily sustaining friction, wear and compressive stresses, and said metallic blocks being of graduated size from relatively small to relatively large blocks whereby the former will fill the voids of the latter, and of another part of geometric spacing blocks having plane faces angular to each other and formed of an oil carrying material and graduated in size from relatively small to relatively large size blocks, and said spacing blocks being soaked with oil to supply lubricant to said metallic blocks.

In witness whereof, I have hereunto set my hand.

JAMES S. McNAIR.